(12) United States Patent
Sugano

(10) Patent No.: US 9,865,278 B2
(45) Date of Patent: *Jan. 9, 2018

(54) AUDIO SIGNAL PROCESSING DEVICE, AUDIO SIGNAL PROCESSING METHOD, AND AUDIO SIGNAL PROCESSING PROGRAM

(71) Applicant: JVC KENWOOD Corporation, Yokohama-shi, Kanagawa (JP)

(72) Inventor: Masato Sugano, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,624

(22) Filed: Mar. 1, 2016

(65) Prior Publication Data

US 2016/0267920 A1 Sep. 15, 2016

(30) Foreign Application Priority Data

Mar. 10, 2015 (JP) .................................. 2015-046990
Jan. 6, 2016 (JP) .................................. 2016-001086

(51) Int. Cl.
  *G10L 21/0232* (2013.01)
  *H04B 15/00* (2006.01)
  *G10L 25/84* (2013.01)
  *H04M 9/08* (2006.01)
  *H04B 3/23* (2006.01)

(52) U.S. Cl.
  CPC .......... *G10L 21/0232* (2013.01); *G10L 25/84* (2013.01); *H04M 9/08* (2013.01); *H04B 3/234* (2013.01)

(58) Field of Classification Search
  CPC ...... G10L 25/18; G10L 15/26; G10L 22/0272

USPC ...................................... 704/501; 381/97, 98
See application file for complete search history.

(56) References Cited

U.S. PATENT DOCUMENTS

2008/0317260 A1* 12/2008 Short ...................... G10L 21/02
                                                        381/92
2014/0079248 A1*  3/2014 Short ................... G10L 21/0272
                                                        381/119
2015/0245137 A1*  8/2015 Sugano ............... G10L 21/0232
                                                        381/73.1

FOREIGN PATENT DOCUMENTS

JP        2007-053512 A      3/2007

OTHER PUBLICATIONS

Jourjine et al "Blind separation of Disjoint Orthogonal Signals: Demixing N Source from 2 Mixtures", IEEE ICASP 2000.*

* cited by examiner

*Primary Examiner* — Paras D Shah
*Assistant Examiner* — Yi-Sheng Wang
(74) *Attorney, Agent, or Firm* — Nath, Goldberg & Meyer; Jerald L. Meyer; Stanley N. Protigal

(57) ABSTRACT

A frequency domain converter is configured to create a plurality of pieces of frequency domain information by individually converting a plurality of input audio signals, which is acquired at different positions, into frequency domain information. A relative value calculator is configured to calculate a relative value of time frequency components of at least one set of frequency domain information among the plurality of pieces of frequency domain information. A signal determiner is configured to determine whether or not each of the input audio signals includes an audio signal component, which is emitted from a predetermined position, based on whether or not the relative value is included in a range specified and based on a relative threshold value stored in a memory in advance.

6 Claims, 8 Drawing Sheets

AUDIO SIGNAL PROCESSING DEVICE, AUDIO SIGNAL PROCESSING METHOD, AND AUDIO SIGNAL PROCESSING PROGRAM

CROSS REFERENCE TO RELATED APPLICATION

This application is based upon and claims the benefit of priority under 35U.S.C.§119 from Japanese Patent Applications No. 2015-046990 filed on Mar. 10, 2015, and No. 2016-001086 filed on Jan. 6, 2016; the entire contents of both of which are incorporated herein by reference.

BACKGROUND

The present disclosure relates to an audio signal processing device, an audio signal processing method, and an audio signal processing program, which determine the state of a voice signal.

In recent years, users have been restrained from operating a telephone to make a call while driving an automobile, so a hands-free call system using a short-range radio communication or the like has been introduced.

In the hands-free call system, a so-called echo voice signal hinders the call, in which a voice emitted by a near end during the call propagates from a speaker of a far end, is inputted to a microphone, and is heard also by the near end via a telephone line, a network, or the like.

In order to suppress such an echo voice signal as described above, varieties of echo cancellation and echo suppression technologies have been proposed. However, when the voice signal is suppressed in a state where both of the far end and the near end utter calls, that is, in a state of a so-called double talk, not only an unnecessary echo voice signal on the far end but also a necessary voice signal on the near end are suppressed. Hence, it is necessary to determine whether or not double talk is the current state.

Here, with regard to the voice signal on the far end, it just needs to be determined whether or not a voice signal on the other end of the call is present, and accordingly, a voice determination technology known in public can be used. Meanwhile, with regard to the voice signal on the near end, it is necessary to determine not only whether or not the voice signal is present, but also whether or not the voice concerned is the voice signal of the near end or the echo voice signal. Hence, in the voice determination technology known in public, it has been difficult to determine whether or not the voice signal of the near end is included in the voice signal on the near end.

Japanese Unexamined Patent Application Publication No. 2007-53512 describes technology for determining the state of the voice on the near end based on the volume ratio of the voice output signal and the voice input signal.

SUMMARY

In a moving automobile, there are various noises, and accordingly, the state of the voice on the near end cannot be determined accurately based on the volume ratio of the voice output signal and the voice input signal.

A first aspect of the embodiments provides an audio signal processing device including: a frequency domain converter configured to create a plurality of pieces of frequency domain information by individually converting a plurality of input audio signals, which are acquired at different positions, into the frequency domain information; a relative value calculator configured to calculate a relative value of time frequency components of at least one set of frequency domain information among the plurality of pieces of frequency domain information; and a signal determiner configured to determine whether or not each of the input audio signals includes an audio signal component, which is emitted from a predetermined position, based on whether or not the relative value is included in a range specified and based on a relative threshold value stored in a memory in advance.

A second aspect of the embodiments provides an audio signal processing method including: creating a plurality of pieces of frequency domain information by individually converting a plurality of input audio signals, which are acquired at different positions, into the frequency domain information; calculating a relative value of time frequency components of at least one set of frequency domain information among the plurality of pieces of frequency domain information; and determining whether or not each of the input audio signals includes an audio signal component, which is emitted from a predetermined position, based on whether or not the relative value is included in a range specified and based on a relative threshold value stored in a memory in advance.

A third aspect of the embodiments provides an audio signal processing program stored in a non-transitory computer readable storage medium for causing a computer to perform: frequency domain conversion processing for creating a plurality of pieces of frequency domain information by individually converting a plurality of input audio signals, which are acquired at different positions, into the frequency domain information; relative value calculation processing for calculating a relative value of time frequency components of at least one set of frequency domain information among the plural pieces of frequency domain information; and signal determination processing for determining whether or not each of the input audio signals includes an audio signal component, which is emitted from a predetermined position, based on whether or not the relative value is included in a range specified and based on a relative threshold value stored in a memory in advance.

DETAILED DESCRIPTION

Embodiment 1

Figure 1:
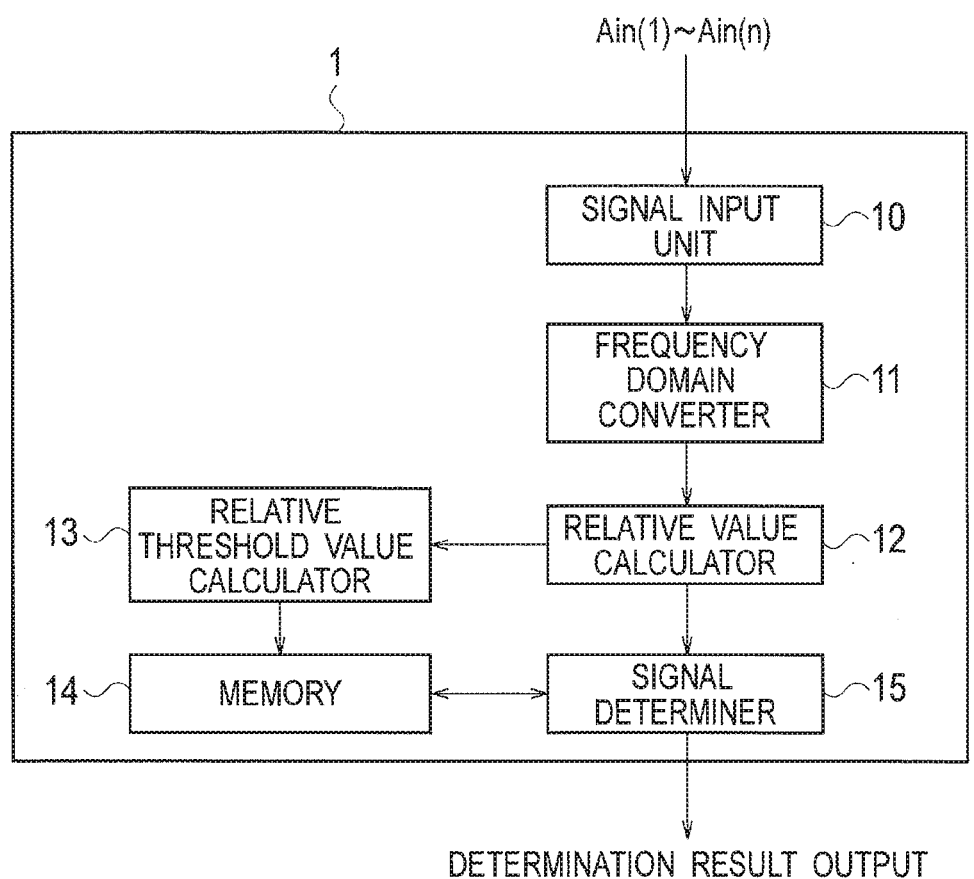
FIG. 1 is a block diagram showing an audio signal processing device according to Embodiment 1.

A description is made below of Embodiment 1 with reference to the accompanying drawings. FIG. 1 shows a block diagram of audio signal processing device 1 according to Embodiment 1. The audio signal processing device 1 acquires input audio signals from two or more voice acquisition units (for example, sensors such as microphones), which are placed at different positions for each of the voice acquisition units.

As shown in FIG. 1, the audio signal processing device 1 includes: a signal input unit 10; a frequency domain converter 11; a relative value calculator 12; a relative threshold value calculator 13; a memory 14; and a signal determiner 15.

The signal input unit 10 and the memory 14 are composed of hardware. The frequency domain converter 11, the relative value calculator 12, the relative threshold value calculator 13, and the signal determiner 15 are realized by an audio signal processing program executed by an arithmetic operation unit such as a CPU (Central Processing Unit) or a DSP (Digital Signal Processor). In this case, the audio signal processing program is stored in a non-transitory storage medium readable by various types of computers, and is supplied to the computers. Moreover, the respective constituents realized by the program may be composed of hardware.

The signal input unit 10 acquires a plurality of input audio signals Ain(1) to Ain(n) from a plurality of voice acquisition units (not shown). Then, the signal input unit 10 converts the plurality of input audio signals Ain(1) to Ain(n), which are thus inputted into digital signals. Note that in the case where the input audio signals are already of digital values, a configuration for converting the input audio signals into digital signals is not required. A description is made below of an example of processing two input audio signals as the first input audio signal Ain(1) and the second input audio signal Ain(2), acquired by using two voice acquisition units.

In the case of using the audio signal processing device 1 in a vehicle cabin, desirably, microphones are placed at positions in front of the near end (mainly a driver), the position including the insides of a steering wheel, a sun visor, a map, a dashboard, or the like. Moreover, it is desirable that such two microphones are placed at an interval of less than several centimeters in order to accurately calculate information of an amplitude ratio and a phase difference.

The frequency domain converter 11 converts the two input audio signals Ain(1) and Ain(2) which are acquired in the signal input unit 10, into frequency domain information for each of the input audio signals, and creates two pieces of frequency domain information. Here, the frequency domain converter 11 divides the input audio signals by a window function with a predetermined frame length, implements processing such as FFT for the input audio signals for each of the divided frames, and creates the frequency domain information.

Here, $\tau$ is defined as a frame number, f is defined as a frequency, and n is defined as an input audio signal number, whereby the frequency domain information is described as $Xn(f,\tau)$. The frequency domain converter 11 creates frequency domain information $X1(f,\tau)$ so as to correspond to the first input audio signal Ain(1), and creates frequency domain information $X2(f,\tau)$ so as to correspond to the second input audio signal Ain(2). Then, the frequency domain converter 11 supplies the created frequency domain information to the relative value calculator 12.

The relative value calculator 12 calculates a relative value between a time frequency component, which is included in one piece of the frequency domain information, and a time frequency component, which is included in another piece of the frequency domain information for each piece of the frequency domain information created by the frequency domain converter 11, and calculates two relative values corresponding to two pieces of the frequency domain information.

Specifically, the relative value calculator 12 calculates at least one of an amplitude relative value and a phase relative value as the relative value. The amplitude relative value indicates a ratio of an amplitude component of the time frequency component, which is included in one piece of the frequency domain information, and an amplitude component of the time frequency component, which is included in the other piece of the time frequency information. The phase relative value indicates a difference of a phase component of the time frequency component, which is included in one piece of the frequency domain information, and a phase component of the time frequency component, which is included in the other piece of the time frequency information.

Here, a description is made of an example of a calculation method of the relative value in the relative value calculator 12. For example, the relative value calculator 12 calculates an amplitude relative value $\alpha(f, \tau)$ between frequency domain information $X1(f,\tau)$ and frequency domain information $X2(f,\tau)$, based on Equation (1). Moreover, the relative value calculator 12 calculates a phase relative value $\delta(f,\tau)$ between the frequency domain information $X1(f,\tau)$ and the frequency domain information $X2(f,\tau)$ based on Equation (2). In Equation (2), Im represents an imaginary part of a complex number, and $\omega$ represents an angular frequency.

$$\alpha(f,\tau)=\|X2(f,\tau)/X1(f,\tau)\| \qquad (1)$$

$$\delta(f,\tau)=\mathrm{Im}(\log(X1(f,\tau)/X2(f,\tau))/\omega) \qquad (2)$$

In the initial setting processing, the relative value calculator 12 supplies the relative values to the relative threshold value calculator 13. Moreover, in signal determination processing, the relative value calculator 12 supplies the relative values to the signal determiner 15. The initial setting processing and the signal determination processing will be described later.

In the case where three or more voice acquisition units are present, the relative value calculator 12 may calculate the relative values in sets (of a number of combinations in each of which two input audio signals are selected from n pieces of the input audio signals) of all of the input audio signals selected from the respective voice acquisition units, or may calculate the relative values in sets (for example, only one set) of a part of the input audio signals.

The relative threshold value calculator 13 calculates a relative threshold value based on the relative values calculated by the relative value calculator 12.

The relative threshold value calculator 13 stores the relative values, which are supplied from the relative value calculator 12 in the memory 14. Then, the relative threshold value calculator 13 creates a two-dimensional histogram by using the two relative values thus stored.

The relative threshold value calculator 13 calculates a relative threshold value by using the two-dimensional histogram. The relative threshold value calculator 13 stores the relative threshold value in the memory 14. The relative threshold value will be described later.

The signal determiner 15 determines whether or not an input signal includes a predetermined signal based on the relative values supplied from the relative value calculator 12 and the relative threshold value stored in the memory 14.

That is, the signal determiner 15 performs processing for determining whether or not the input signal includes an audio signal component (hereinafter, referred to as a "predetermined audio signal component") emitted from a predetermined position (for example, a driver in case of a vehicle cabin).

When the audio signal is acquired in the plurality of voice acquisition units placed at different positions, a difference in amplitude or phase occurs between a plurality of input audio signals while being biased to a predetermined domain. This is because a certain attenuation of the amplitude and a certain deviation of the phase occur based on a positional relationship between a signal source that emits the audio signal and the plurality of voice acquisition units.

Accordingly, the signal determiner 15 determines whether or not the input signal includes the predetermined audio signal component based on the difference that occurs between the amplitudes or phases of two input audio signals.

Specifically, the relative threshold value calculator 13 stores a value by which a domain (where the amplitude ratio or the phase difference between two input audio signals) is presented in such a biased manner is specified as the relative threshold value in the memory 14.

The signal determiner 15 determines whether or not the relative values supplied from the relative value calculator 12 stay within the domain specified by the relative threshold value. The signal determiner 15 determines whether or not the input signal includes the predetermined audio signal component based on a determination result as to whether or not the relative values stay within the domain.

In the signal determination processing, the signal determiner 15 determines whether or not the input signal includes the predetermined audio signal component by using the relative threshold value stored in the memory 14. It is possible to store this relative threshold value in the memory 14 in advance before the installation of the device (for example, in a shipment step of the device, or the like). However, in order to make it possible to allow the signal determiner 15 to make an accurate determination, preferably, the relative threshold value calculator 13 calculates the relative threshold value in an environment where the audio signal processing device 1 is installed.

Figure 2:
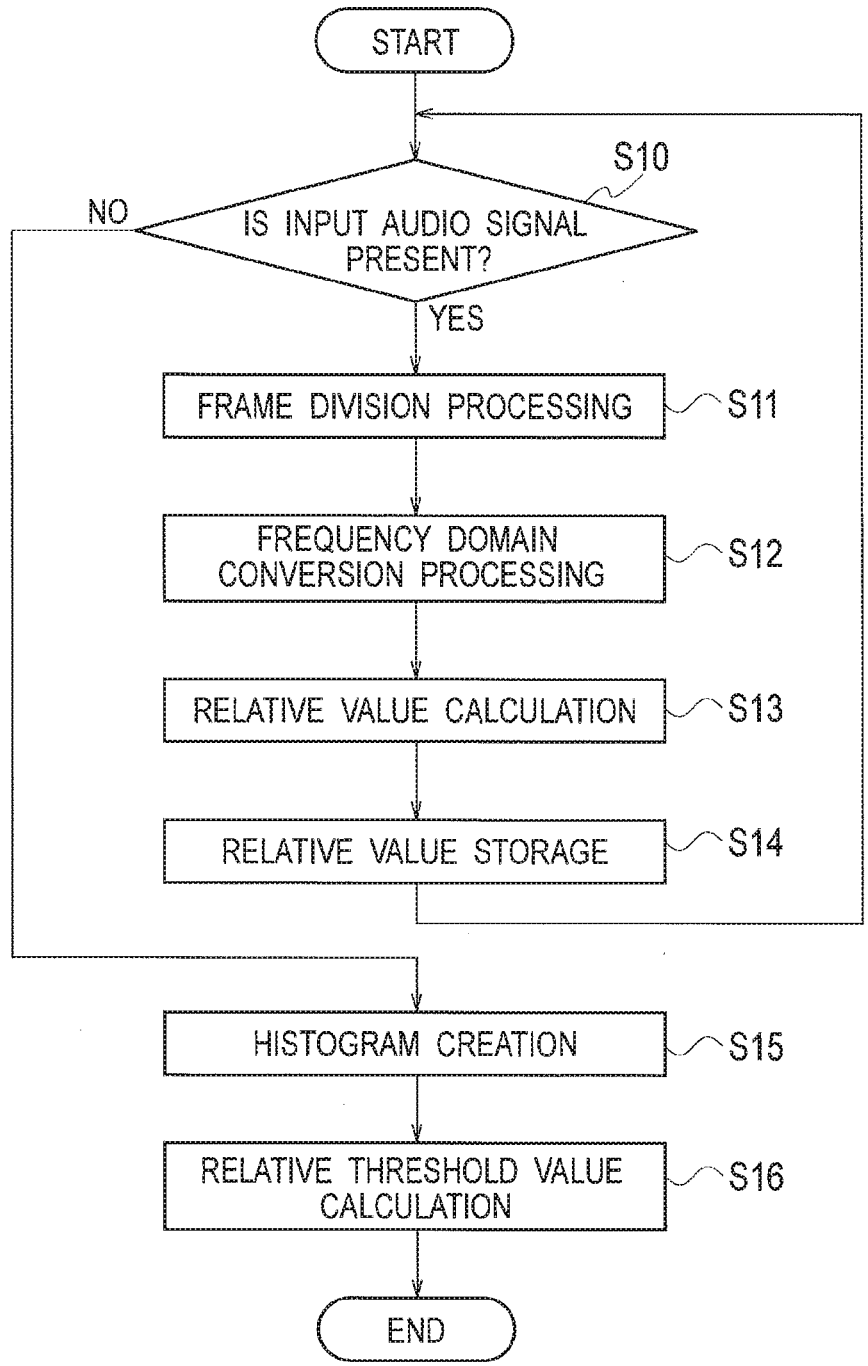
FIG. 2 is a flowchart showing initial setting processing in the audio signal processing device according to Embodiment 1.

Next is a description of the initial setting processing of the audio signal processing device 1 by using FIG. 2. The processing to be described below also applies to procedures executed in an audio signal processing method and an audio signal processing program.

In this initial setting processing, preferably, an audio signal for the initial setting is generated in a state where audio signal components (voice signals of other near ends (speakers), noise signals, or the like) other than the predetermined audio signal component are small. This is in order to further clarify peaks of the two-dimensional histogram created by the relative threshold value calculator 13.

Moreover, preferably, the audio signal for the initial setting is generated from a voice output unit put at a position from which the predetermined audio signal component is emitted. This is in order to reproduce the amplitude relative value and phase relative value of the predetermined audio signal component, and to create an accurate relative threshold value.

As mentioned above, the audio signal for the initial setting may be the predetermined audio signal generated by the voice output unit (not shown), or the voice of a driver or the like sitting on the driver's seat. Moreover, processing that is based on the flowchart of FIG. 2 may be started in response to the emission of the audio signal for the initial setting from the voice output unit.

In step S10, the signal input unit 10 determines whether or not the input audio signal is present. In the case where the input audio signal is present (step S10: YES), the signal input unit 10 shifts the processing to step S11.

That is, in the initial setting processing, the audio signal processing device 1 repeatedly executes processing of step S11 to step S14 during a period while the input audio signal is inputted continuously.

Note that the frequency domain converter 11 may determine whether or not the input audio signal is present by using the frequency domain information. In this case, the determination as to whether or not the input audio signal is present is implemented after step S12 and before step S13.

In step S11, the frequency domain converter 11 divides the input audio signal into frames. Moreover, in step S12, the frequency domain converter 11 converts the input audio signal from the information of the time domain to information of a frequency domain.

In step S13, the relative value calculator 12 calculates the relative values by using the plurality of input audio signals. Then, the relative value calculator 12 stores the relative values, which are calculated in step S14, in the memory 14.

Returning to step S10, in the case where the signal input unit 10 does not receive an input of the input audio signal (step S10: No), the signal input unit 10 shifts the processing to step S15.

In step S15, the relative threshold value calculator 13 creates a two-dimensional histogram from the relative values stored in the memory 14.

Figure 3:
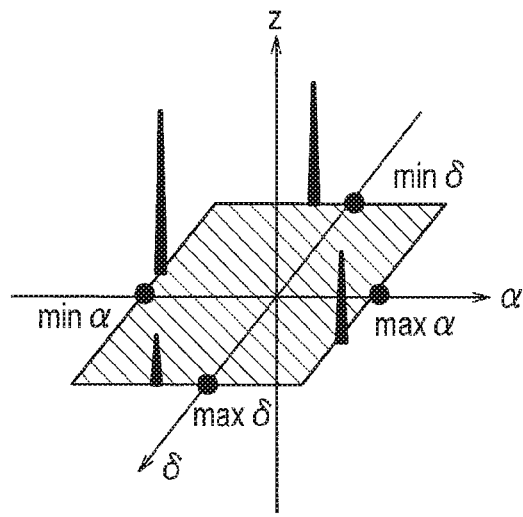
FIG. 3 is a graph showing a first example of a domain specified by a relative threshold value according to Embodiment 1.
Figure 4:
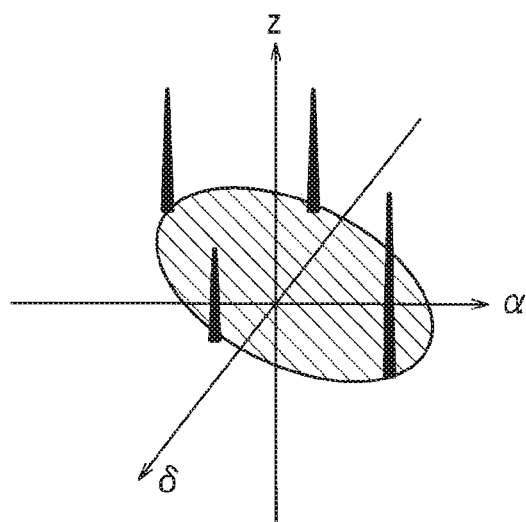
FIG. 4 is a graph showing a second example of the domain specified by the relative threshold value according to Embodiment 1.
Figure 5:
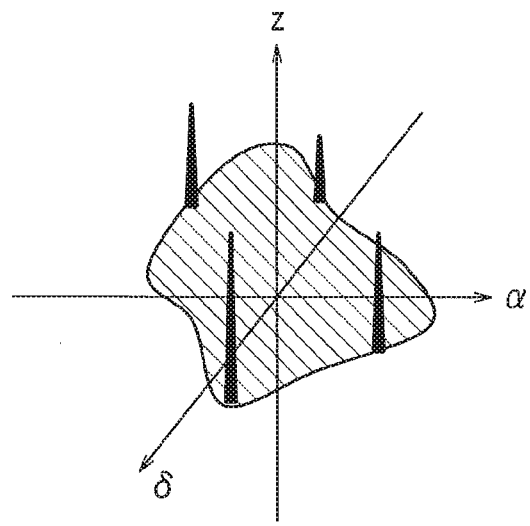
FIG. 5 is a graph showing a third example of the domain specified by the relative threshold value according to Embodiment 1.

Here, a description is made in detail of the relationship between the two-dimensional histogram and the relative threshold value. FIG. 3 to FIG. 5 show three examples of a graph with a domain determined by the relative threshold value.

Each of the graphs shown in FIG. 3 to FIG. 5 is a graph with a two-dimensional histogram, in which an axis of abscissas represents the amplitude relative value $\alpha$, an axis of ordinates represents the phase relative value $\delta$, and an axis in a z-direction represents a frequency indicating the frequency of appearance of the relative values. That is, each coordinate of the two-dimensional histogram is represented as (amplitude relative value $\alpha$, phase relative value $\delta$, frequency z) a frequency corresponding to the set of the relative values of $\alpha$ and $\delta$. A coordinate with a high frequency indicates that an input audio signal corresponding to that coordinate has a high frequency. The hatched area of each of the graphs indicates a domain where relative values with a predetermined frequency or more are present. Each isosceles triangle of each of the graphs schematically indicates a part of the relative values with the predetermined frequency or more. Details of each of the graphs will be described later.

Note that, in place of the frequency, a sum (hereinafter, referred to as a "frequency and the like") may be used, of amplitude values or energy values of the time frequency components of the input audio signal corresponding to the coordinate. This is because the time frequency component with a large amplitude value or energy value has a high probability of being a time frequency component derived from the predetermined audio signal component. Not only the sum, but also a statistical value may be used, such as a mean value and median value of the amplitude values, or the energy values.

Returning back to FIG. 2, in step S16, the relative threshold value calculator 13 detects a domain where the set of the relative values in which the frequencies reach a predetermined value or more is present. The relative threshold value calculator 13 calculates a relative threshold value that specifies this domain as a domain where the predetermined audio signal component is present.

Here, a description is made in detail of such processing by which the relative threshold value calculator 13 calculates the relative threshold value. In the following description, each of the peaks indicating the frequencies with a predetermined value or more is referred to as a "significant peak". As this predetermined value, a statistical value such as a mean value and median value of the frequencies of the respective coordinates may be used. Moreover, as this predetermined value, there may be used: a value located between the statistical value and a maximum frequency value; a sum of the statistical value and a value indicating variations, such as a standard deviation; a value obtained by multiplying the maximum frequency value by a predetermined coefficient; or the like.

In the first example shown in FIG. 3, an upper limit value of the amplitude relative values in the domain where the significant peaks are present on the two-dimensional histogram is defined as an amplitude ratio upper limit value $\max\alpha$, and a lower limit value thereof is defined as an amplitude ratio lower limit value $\min\alpha$, whereby the domain is specified. Moreover, an upper limit value of the phase relative values in the domain (where the significant peaks are present on the two-dimensional histogram) is defined as a phase difference upper limit value $\max\delta$, and a lower limit value thereof is defined as a phase difference lower limit value $\min\delta$, whereby the domain is specified.

In the first example shown in FIG. 3, the relative threshold value calculator 13 specifies a rectangular region, which is determined from four values: the amplitude ratio upper limit value $\max\alpha$, the amplitude ratio lower limit value $\min\alpha$, the phase difference upper limit value $\max\delta$, and the phase difference lower limit value $\min\delta$—as the domain where the predetermined audio signal component is present. In this case, the relative threshold value calculator 13 stores the four values: the amplitude ratio upper limit value $\max\alpha$, the amplitude ratio lower limit value $\min\alpha$, the phase difference upper limit value $\max\delta$, and the phase difference lower limit value $\min\delta$ as such relative threshold values in the memory 14.

In the second example shown in FIG. 4, the relative threshold value calculator 13 specifies a region with a predetermined shape (for example, an ellipsoid or a circle), where the significant peaks are present on a two-dimensional histogram, the region including a part or all of the relative values as the domain where the predetermined audio signal component is present. In this case, the relative threshold value calculator 13 stores, as the relative threshold values, information (for example, a center and radius of the circle, a center, minor axis and major axis of the ellipsoid, or the like) for specifying the predetermined shape in the memory 14.

In the third example shown in FIG. 5, the relative threshold value calculator 13 specifies a region with an arbitrary shape (for example, a shape obtained by connecting the coordinates of the significant peaks to one another by straight or curved lines), where the significant peaks are present on a two-dimensional histogram, the region including a part or all of the relative values as the domain where the predetermined audio signal component is present. In this case, the relative threshold value calculator 13 stores, as the relative threshold values, a part or all the coordinates of the significant peaks located on an outer periphery of the arbitrary shape in the memory 14.

As described above, the relative threshold value calculator 13 specifies the domain by a predetermined shape (such as the rectangle and the ellipsoid, or the arbitrary shape) so that the domain can include all or part of the relative values in which the significant peaks are detected. The relative threshold value calculator 13 may use a shape decided in advance, or may select and use a shape most similar to the distribution of the significant peaks.

Figure 6:
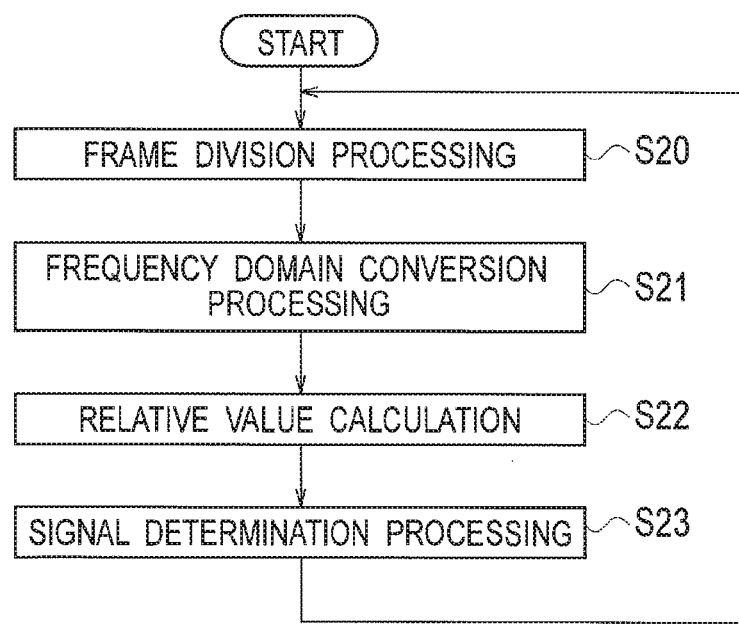
FIG. 6 is a flowchart showing signal determination processing in the audio signal processing device according to Embodiment 1.

Next is a description of the signal determination processing of the audio signal processing device 1 according to Embodiment 1, by using FIG. 6.

In step S20, the frequency domain converter 11 divides the input audio signal into frames. Moreover, in step S21, the frequency domain converter 11 converts the input audio signal from the information of the time domain to information of a frequency domain.

In step S22, the relative value calculator 12 calculates the relative values by using the plurality of input audio signals.

In step S23, the signal determiner 15 refers to the relative threshold value stored in the memory 14, and determines whether or not the input audio signal includes the predetermined audio signal component.

Desirably, the signal determiner 15 determines whether or not the input audio signal includes the predetermined audio signal component based on whether or not the frequency or the like in the domain of the histogram specified by the relative threshold value exceeds a predetermined value. Moreover, the signal determiner 15 may implement the signal determination processing by comparing the frequencies or the like in the inside and outside of the domain of the histogram specified by the relative threshold value with each other.

The audio signal processing device 1, according to Embodiment 1, determines whether or not the input audio signal includes the predetermined audio signal component based on the relative threshold value stored in advance and based on the relative values calculated from the input audio signal inputted continuously.

As described above, the audio signal processing device 1, according to Embodiment 1, determines whether or not the input audio signal includes the signal derived from the predetermined audio signal component, based on the relative values calculated from the plurality of input audio signals. The audio signal processing device 1, according to Embodiment 1, uses the relative values, and can thereby make the determination without depending on a volume of the input audio signal. Hence, the audio signal processing device 1, according to Embodiment 1, can determine the state of the voice signal on the near end without depending on the volume of the input audio signal.

The audio signal processing device 1, according to Embodiment 1, determines whether or not the voice signal on the far end is present by using the voice determination technology known in public, and can thereby determine whether or not the current state is double talk.

Note that the present invention is not limited to the above-described embodiment, and is appropriately changeable within the scope without departing from the scope of the embodiment. For example, a plurality of the positional relationships between the signal source of the predetermined audio signal component and the voice acquisition units may be determined, and a plurality of the relative threshold values may be stored in the memory 14 for each of the plurality of positional relationships. In this case, the relative threshold value for use can be selected and used from the plurality of relative threshold values in response to a situation of utilization of the audio signal processing device 1.

Embodiment 2

Desirably, the audio signal processing device, according to Embodiment 1, employs a so-called non-directional microphone, which has flat directional characteristics as the signal input unit 10. However, because of the configuration of the device, a microphone having fixed directional characteristics or a low-cost microphone cannot help but to be employed in some cases.

In the former case, with regard to a signal component coming from a fixed direction, an accurate relative value in two microphones cannot be calculated in some cases because of the structure of the device. In the latter case, an individual difference occurs in hardware performance such as input sensitivity, and in some cases, the accurate relative value cannot be calculated.

In such a case, the distribution of a two-dimensional histogram of the amplitude ratio and the phase difference, which are calculated from the plurality of microphones, is put in disorder in comparison with the case of the non-directional microphone. As a result, it becomes difficult to determine the appropriate amplitude ratio and range of the phase difference, and to calculate the relative threshold value.

Accordingly, in Embodiment 2, not the two-dimensional histogram of the phase difference and the amplitude ratio but separate one-dimensional histograms of the phase difference and the amplitude ratio are created, and distribution ranges of the amplitude ratio and the phase difference are obtained.

A difference between Embodiment 1 and Embodiment 2 is only the processing of the relative threshold value calculator 13 in the initial setting processing. Hence, in Embodiment 2, only details of the processing are described, and the description of the processing in the other blocks is omitted.

The relative threshold value calculator 13 creates a histogram for each of the amplitude ratio and the phase difference, which are calculated by the relative value calculator 12. Desirably, the histogram takes the amplitude ratio or the phase difference as an axis of abscissas thereof, and takes the frequency or the like as an axis of ordinates thereof. Moreover, in the histogram, fluctuations of the frequency or the like become large in some cases, depending on the settings of class intervals for calculating the frequency or the like. Desirably, the histogram is created while widening the class interval to a certain extent, or smoothing processing is implemented after the histogram is created.

Figure 7:
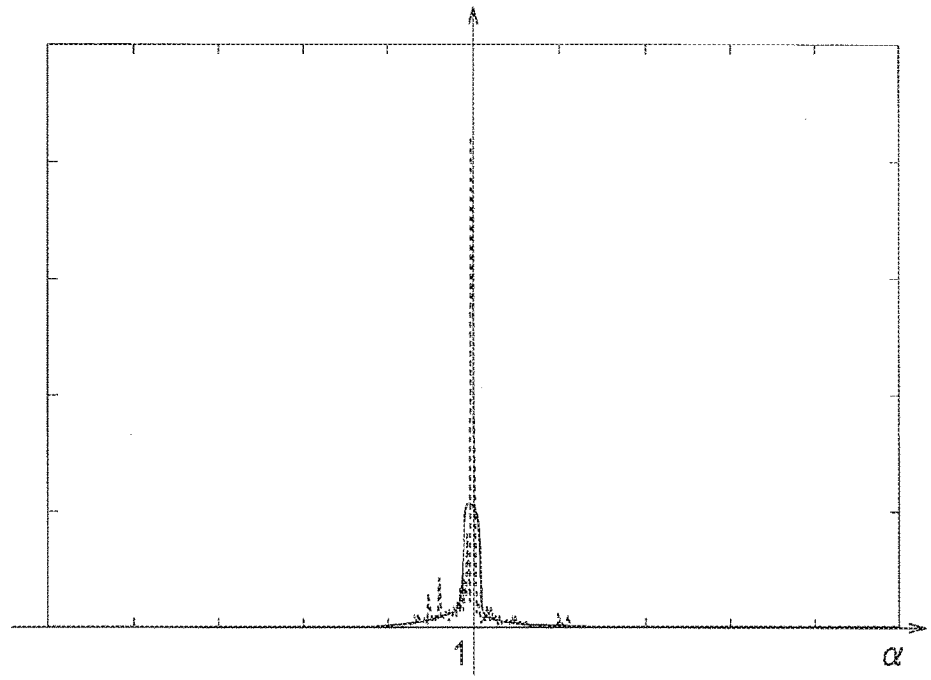
FIG. 7 is a view showing an example of an amplitude ratio histogram in the case of using a non-directional microphone according to Embodiment 2.
Figure 8:
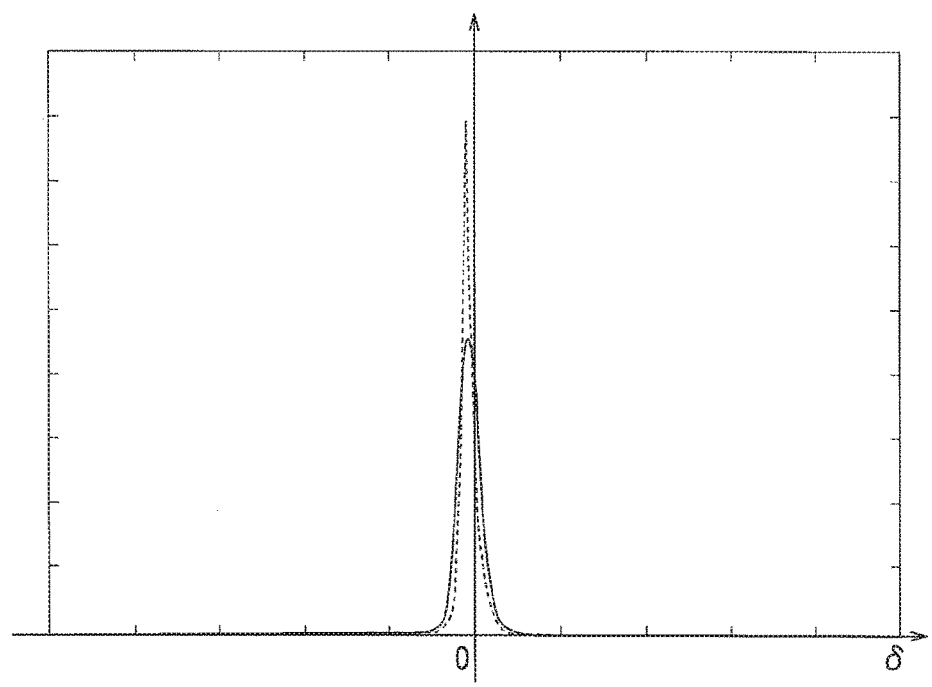
FIG. 8 is a view showing an example of a phase difference histogram in the case of using a non-directional microphone according to Embodiment 2.

Here, a description is made of a difference between the histogram of the non-directional microphone and the histogram of the front-directional microphone. The front-directional microphone is an example of a microphone having directivity. FIG. 7 and FIG. 8 show examples of the histograms in the case of using the non-directional microphone. In each of FIG. 7 and FIG. 8, a dotted line shows values of the actual frequencies or the like, and a solid line shows values obtained by smoothing the values of the frequencies and the like by a moving average. Data for use in creating the histograms is data in the case where a near end is located just in front of two microphones.

FIG. 7 shows an example of the histogram, in which the amplitude ratio is taken as an axis of abscissas, and a sum of the amplitude value is taken as an axis of ordinates. A peak of the histogram appears in a vicinity of an origin (defined as $\alpha=1$). That is, FIG. 7 shows that the near end as a sound source is located at an equal distance from two microphones.

FIG. 8 shows an example of the histogram, in which the phase difference is taken as an axis of abscissas, and a sum of the amplitude values is taken as an axis of ordinates. A peak of the histogram appears in a vicinity of an origin (defined as $\delta=0$). That is, FIG. 8 shows that the near end as a sound source is located at an equal distance from two microphones.

In such a case where the non-directional microphones are used and the near end is located just in front thereof, then as shown in FIG. 7 and FIG. 8, each of the histograms shows a steep peak in the vicinity of the origin. In this case, in the two-dimensional histogram, each of the two-dimensional diagrams show a steep peak with an approximately conical shape. As described above, in the case of the non-directional microphones, it is easy to acquire the distribution range.

Figure 9:
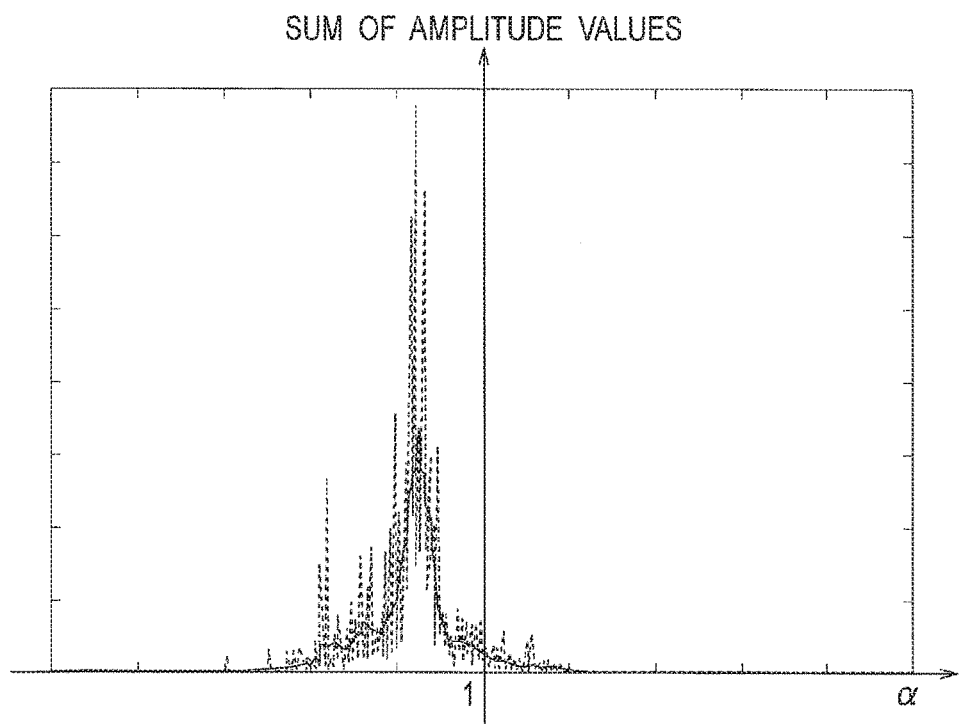
FIG. 9 is a view showing an example of an amplitude ratio histogram in the case of using a front-directional microphone according to Embodiment 2.
Figure 10:
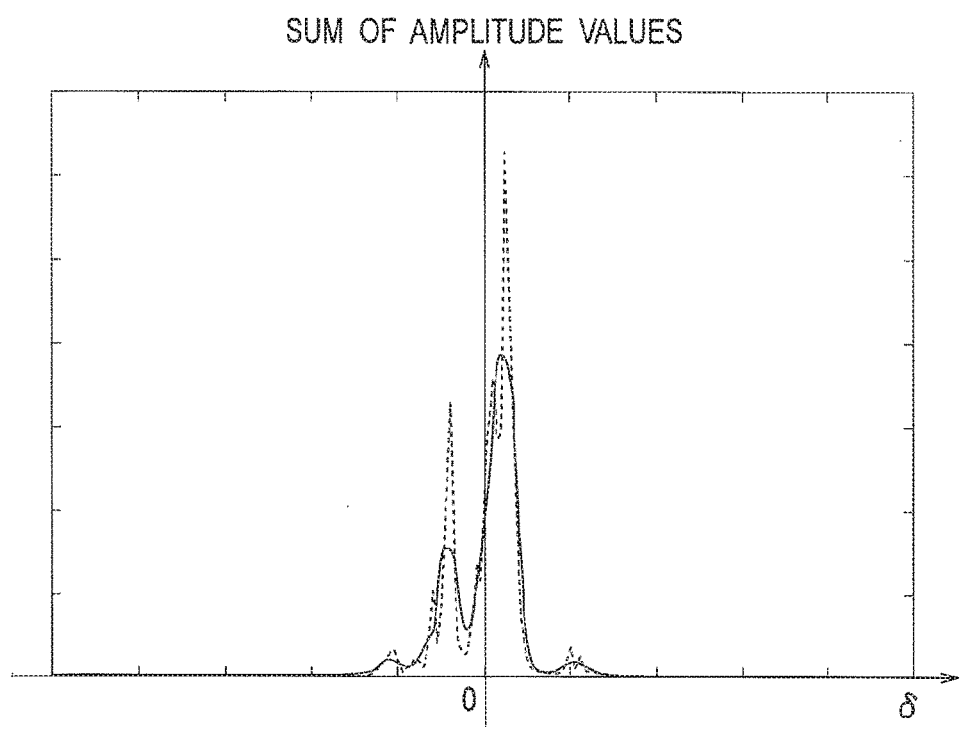
FIG. 10 is a view showing an example of a phase difference histogram in the case of using a front-directional microphone according to Embodiment 2.

FIG. 9 and FIG. 10 show examples of the histogram in the case of using the microphone having front directivity. In a similar way to FIG. 7 and FIG. 8, in each of FIG. 9 and FIG. 10, a dotted line shows values of the actual frequencies or the like, and a solid line shows values obtained by smoothing the values of the frequencies or the like by a moving average. Data for use in creating the histograms is data in the case where the near end is located obliquely in front of two microphones. That is, distances from two microphones to the near end as a sound source are different from each other.

FIG. 9 shows an example of the histogram, in which the amplitude ratio is taken as an axis of abscissas, and a sum of the amplitude values is taken as an axis of ordinates. A peak is located apart from the origin ($\alpha=1$), and coincides with a positional relationship between the near end as a sound source and the microphones. Moreover, in comparison with the distribution in a non-directional microphone, it is understood that the distribution in the front-directional microphone has a wide distribution range, and also has a wide width of the amplitude values. When the two distributions are compared with each other, the distribution of the microphone having the directivity is a disordered distribution.

FIG. 10 shows an example of the histogram, in which the phase difference is taken as an axis of abscissas, and a sum of the amplitude values is taken as an axis of ordinates. A peak is located apart from the origin ($\delta=0$), and coincides with the positional relationship between the near end as a sound source and the microphones. Moreover, in comparison with the distribution of the non-directional microphone, it is understood that a plurality of small peaks is present.

In this case, unlike the non-directional microphone, the two-dimensional histogram becomes such a disordered distribution varied depending on a situation of measurement, the distribution including a distribution where peaks continue in a mountain-like shape, and a distribution in which small peaks are dotted. In such a disordered distribution, conditions for determining whether or not a certain relative value is within the range of the relative threshold value are increased, leading to an increase in processing time.

Figure 11:
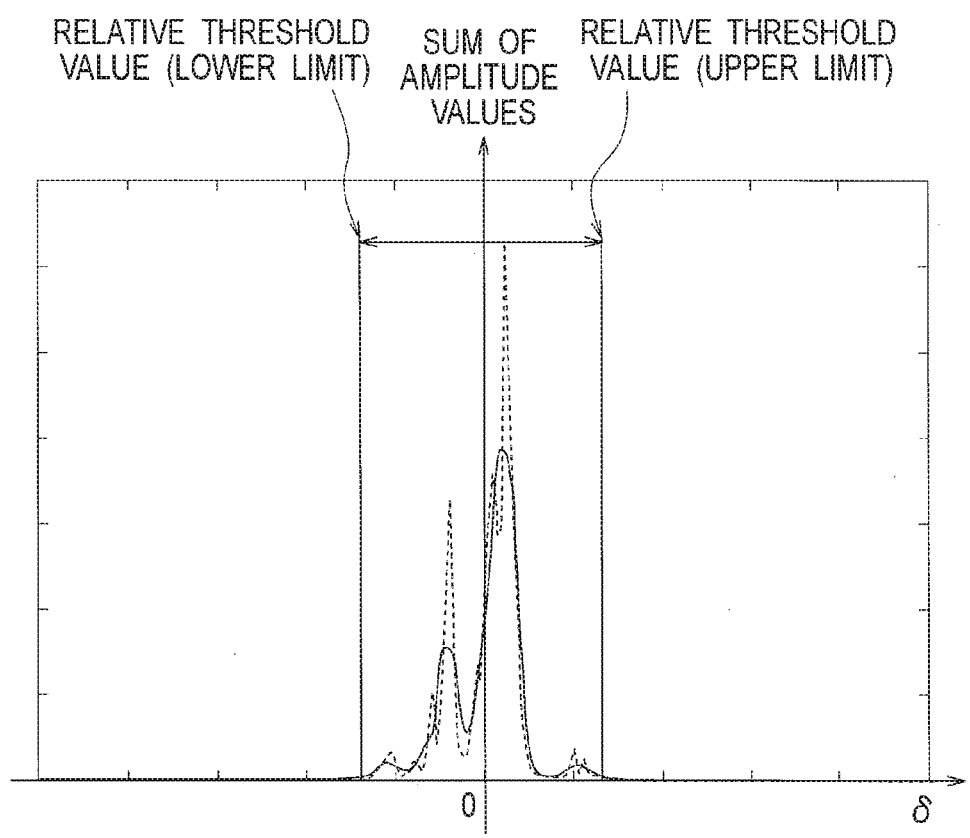
FIG. 11 is a view showing a relationship between an example of a histogram and the domain of the relative threshold values according to Embodiment 2.

After the histograms are created, the relative threshold value calculator 13 calculates the relative threshold value from the distribution range of the relative values for each of the amplitude ratio and the phase difference. Specifically, a maximum value and minimum value of the relative values, which are included in the distribution range of the relative values in which the frequencies or the like indicating appearance frequencies of the relative values reach a predetermined value or more, are defined as such relative threshold values. That is, as shown in FIG. 11, a maximum value (upper limit value) and a minimum value (lower limit value), within the range of a two-way arrow (which is the distribution range of the relative values in which the frequencies and the like reach the predetermined value or more), are defined as the relative threshold values.

In the case of the vehicle cabin, a peak is created also at a position apart from a peak, in which the frequencies and the like indicate the maximum value, due to a signal component delayed by reflecting on a side window or the like, and in some cases, a plurality of the ranges is generated where the frequencies and the like reach the predetermined value or more. Since it is necessary to exclude the range generated due to the delayed signal component, desirably, the range from which the relative threshold values are obtained is set to a range including the position of the peak in which the frequencies and the like indicate the maximum value.

Here, a description is made of a method for calculating the predetermined value of the frequencies or the like. As in a portion of the dotted circle in an enlarged view shown in FIG. 12, the upper limit and lower limit of the relative threshold value approximately coincide with a point increased steeply toward the peak. This is because the amplitude value becomes suddenly large since there appears the time frequency component derived from the predetermined audio signal component.

Figure 12:
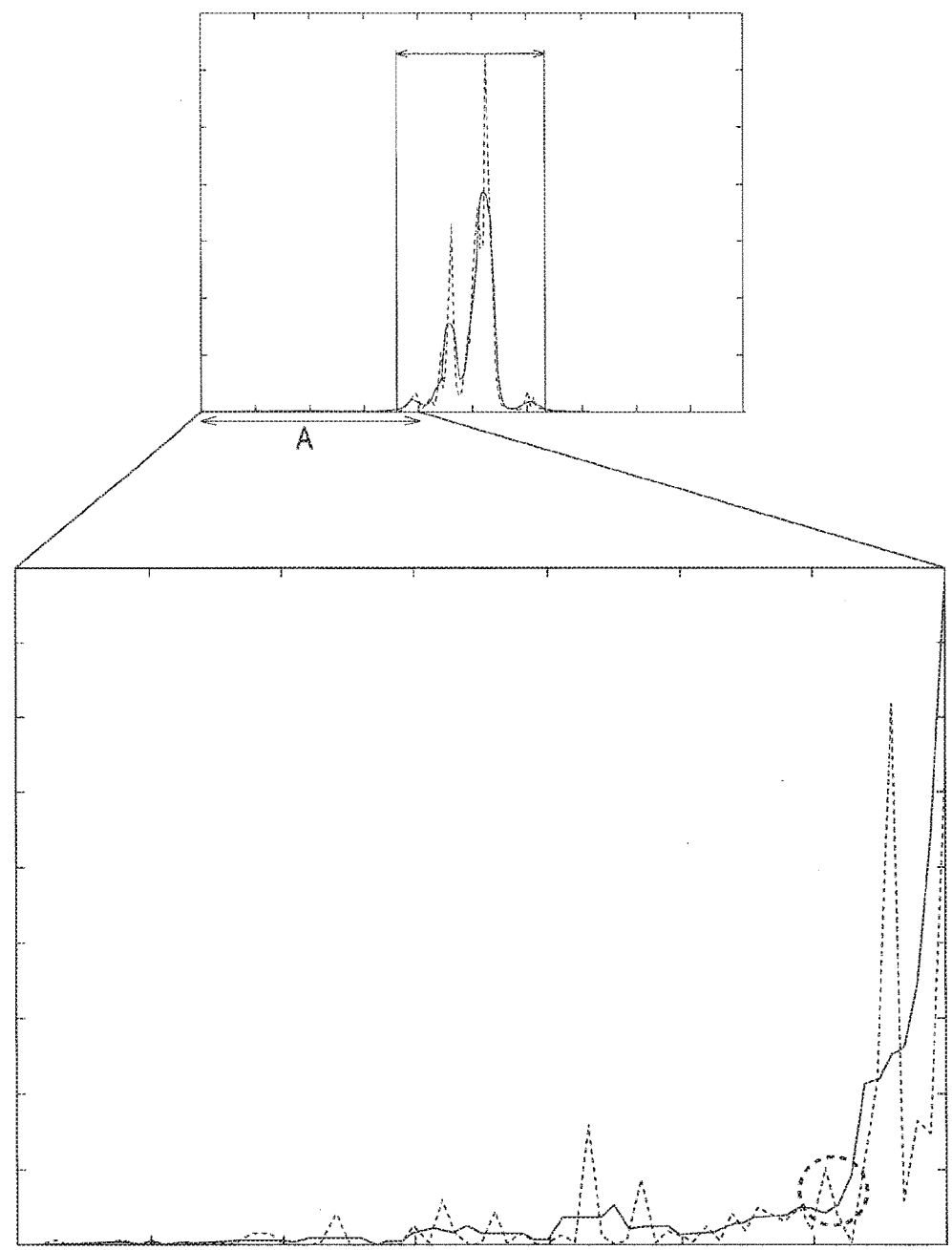
FIG. 12 is a view enlarging and displaying a part of the example of the histogram according to Embodiment 2.

However, in portions on both right-and-left ends of the histogram, the portions gradually approaching the x-axis, fluctuations are large as enlarged and displayed in FIG. 12, and accordingly, the point cannot be calculated in some cases only by an increment of the histogram. Hence, as a method for detecting the point, there is mentioned a method for obtaining extreme values of differential values by implementing smoothing differentiation of the histogram.

Moreover, there is also mentioned a method for calculating a statistical value such as a mean value from the histogram and defining the calculated statistical value as the predetermined value. However, when the statistical value such as the mean value is simply calculated from the entire interval of the histogram, a value larger than a desired predetermined value is calculated, since there is a value divergence between the portions on both the right-and-left ends of the histogram, the portions gradually approaching the x-axis, and portions on the periphery of the peak are large. Therefore, the range of the relative threshold value is calculated to be narrow.

Accordingly, a tentative predetermined value (for example, a value obtained by multiplying the maximum value by 0.1, or the like) is calculated once based on a value of the frequency and the like of the peak indicating the maximum value, and an interval of the calculated value or more is excluded. Next, the statistical value, such as the mean value, is calculated from a remaining interval, where by the predetermined value concerned is obtained, and such a method is mentioned. As described above, the predetermined value is calculated step by step, whereby the interval defined by the predetermined value is an interval always larger than the portion of FIG. 12, the portion gradually approaching the x-axis, and such a steep increase point as in the portion of the dotted circle can be acquired accurately.

The relative threshold value calculator 13 calculates the relative threshold value by the above-mentioned processing, thereafter storing the relative threshold value in the memory 14, and completing the initial setting processing. Subsequent signal determination processing is similar to that of Embodiment 1.

By the above-described processing, there can be calculated the relative threshold value, which does not bring about an enormous processing time, and can maintain fixed determination accuracy even when microphones other than the non-directional microphone are used.

What is claimed is:

1. An audio signal processing device comprising:
   a frequency domain converter configured to create a pair of pieces of frequency domain information by individually converting a pair of input audio signals, which are acquired by a pair of sensors placed at different positions for each of the sensors, into the frequency domain information;
   a relative value calculator configured to calculate a plurality of relative values of time frequency components based on the pair of pieces of frequency domain information;
   a signal determiner configured to determine whether or not each of the input audio signals includes an audio signal component, which is emitted from a predetermined position in a vehicle cabin, based on whether or not the plurality of relative values are included in a range specified and based on a relative threshold value stored in a memory in advance; and
   a relative threshold value calculator configured to calculate the relative threshold value based on the plurality of relative values created from the input audio signals including the audio signal components emitted from the predetermined position,
   wherein the relative threshold value calculator is configured to create a histogram of the plurality of the relative values, to obtain a distribution range of peaks in which appearance frequencies reach a predetermined frequency or more in the histogram, to specify, as the relative values, a plurality of relative values located on at least a part of an outer periphery of the distribution range, and to store the specified relative values in the memory.

2. The audio signal processing device according to claim 1, wherein, in a case where a plurality of the distribution ranges are created, the relative threshold value calculator is configured to specify, as the relative threshold values, a plurality of relative values located on at least a part of an outer periphery of the distribution range including a maximum value of the appearance frequencies, and to store the specified relative values.

3. The audio signal processing device according to claim 1, wherein the audio signal processing device is configured to calculate amplitude values or energy of the input audio signals, and to create the histogram of the relative values by using the amplitude values or the energy.

4. The audio signal processing device according to claim 1, wherein the relative value calculator is configured to calculate, as the relative values, at least one of an amplitude relative value indicating a ratio of amplitude components of the time frequency components and a phase relative value indicating a difference between phase components of the time frequency components.

5. An audio signal processing method comprising:

creating a pair of pieces of frequency domain information by individually converting a pair of input audio signals, which are acquired by a pair of sensors placed at different positions for each of the sensors, into the frequency domain information;

calculating a plurality of relative values of time frequency components of based on the pair of pieces of frequency domain information;

determining whether or not each of the input audio signals includes an audio signal component, which is emitted from a predetermined position in a vehicle cabin, based on whether or not the plurality of relative values are included in a range specified and based on a relative threshold value stored in a memory in advance;

calculating the relative threshold value based on the relative values created from the input audio signals including the audio signal components emitted from the predetermined position;

creating a histogram of the plurality of the relative values;

obtaining a distribution range of peaks in which appearance frequencies reach a predetermined frequency or more, specifying, as the relative values, a plurality of relative values located on at least a part of an outer periphery of the distribution range; and storing the specified relative values in the memory.

6. An audio signal processing program stored in a non-transitory computer readable storage medium for causing a computer to perform:

frequency domain conversion processing for creating a pair of pieces of frequency domain information by individually converting a pair of input audio signals, which are acquired by a pair of sensors placed at different positions for each of the sensors, into the frequency domain information;

relative value calculation processing for calculating a plurality of relative values of time frequency components based on the pair of pieces of frequency domain information;

signal determination processing for determining whether or not each of the input audio signals includes an audio signal component, which is emitted from a predetermined position in a vehicle cabin, based on whether or not the plurality of relative values are included in a range specified based on a relative threshold value stored in a memory in advance;

relative threshold value calculating processing for calculating the relative threshold value based on the relative values created from the input audio signals including the audio signal components emitted from the predetermined position;

histogram creating processing for creating a histogram of the plurality of the relative values;

distribution range obtaining processing for obtaining a distribution range of peaks in which appearance frequencies reach a predetermined frequency or more in the histogram specifying processing for specifying, as the relative values, a plurality of relative values located on at least a part of an outer periphery of the distribution range and storing processing for storing the specified relative values in the memory.

\* \* \* \* \*